US011215015B1

(12) United States Patent
Guerrero

(10) Patent No.: US 11,215,015 B1
(45) Date of Patent: Jan. 4, 2022

(54) SYSTEM AND METHOD FOR CONTROLLING A DOWNHOLE OPERATION USING A CLUTCH TOOL

(71) Applicant: HALLIBURTON ENERGY SERVICES, INC., Houston, TX (US)

(72) Inventor: Ricardo A. Guerrero, Villahermosa (MX)

(73) Assignee: Halliburton Energy Services, Inc., Houston, TX (US)

(*) Notice: Subject to any disclaimer, the term of this patent is extended or adjusted under 35 U.S.C. 154(b) by 376 days.

(21) Appl. No.: 16/490,921

(22) PCT Filed: Nov. 26, 2018

(86) PCT No.: PCT/US2018/062474
§ 371 (c)(1),
(2) Date: Sep. 4, 2019

(87) PCT Pub. No.: WO2020/112080
PCT Pub. Date: Jun. 4, 2020

(51) Int. Cl.
*E21B 17/046* (2006.01)
*F16D 7/04* (2006.01)
*F16D 3/2233* (2011.01)
*E21B 17/06* (2006.01)

(52) U.S. Cl.
CPC .......... *E21B 17/0465* (2020.05); *E21B 17/06* (2013.01); *F16D 3/2233* (2013.01); *F16D 7/044* (2013.01)

(58) Field of Classification Search
CPC .... E21B 17/0465; E21B 17/06; F16D 3/2233; F16D 7/044
See application file for complete search history.

(56) References Cited

U.S. PATENT DOCUMENTS 1,759,337 A * 5/1930 Zublin .................... E21B 17/06
464/21
2,495,364 A * 1/1950 Clapp ...................... E21B 4/10
175/195
(Continued)

FOREIGN PATENT DOCUMENTS

WO 2017118858 A1 7/2017

OTHER PUBLICATIONS

International Search Report and Written Opinion dated Aug. 12, 2019, of PCT/US2018/062474, filed on Nov. 26, 2018.

*Primary Examiner* — David Carroll
(74) *Attorney, Agent, or Firm* — Chamberlain Hrdlicka

(57) ABSTRACT

A clutch tool includes a housing that is non-rotatable with respect to the first section of the work string and comprising inner grooves. The clutch tool also includes an inner mandrel that is non-rotatable with respect to the second section of the work string. The inner mandrel includes outer grooves that extend along only an axial portion of the inner mandrel. Further, the inner mandrel includes a torque transition area opening from the outer grooves and extending completely around the inner mandrel. The clutch tool also includes a torque sleeve comprising inner protrusions engageable with the outer grooves and outer protrusions engageable with the outer grooves, the outer protrusions being angled. Moreover, the clutch tool includes a biasing device to bias the inner protrusions of the torque sleeve into engagement with the outer grooves.

11 Claims, 4 Drawing Sheets

(56) References Cited

U.S. PATENT DOCUMENTS

| | | | | |
|---|---|---|---|---|
| 4,276,944 | A | * | 7/1981 | Geczy ..................... E21B 4/00 |
| | | | | 175/101 |
| 5,323,852 | A | * | 6/1994 | Cornette ................ E21B 4/00 |
| | | | | 166/117.7 |
| 7,493,960 | B2 | | 2/2009 | Leising et al. |
| 2008/0230218 | A1 | | 9/2008 | Hall et al. |
| 2011/0214963 | A1 | * | 9/2011 | Beylotte ................ E21B 4/02 |
| | | | | 192/106 R |
| 2011/0240313 | A1 | * | 10/2011 | Knobloch, Jr .......... E21B 17/06 |
| | | | | 166/381 |
| 2013/0186690 | A1 | | 7/2013 | Surjaatmadja |
| 2013/0284516 | A1 | | 10/2013 | Prill et al. |

* cited by examiner

SYSTEM AND METHOD FOR CONTROLLING A DOWNHOLE OPERATION USING A CLUTCH TOOL

BACKGROUND

In downhole operations, a work string with multiple sections is often used to perform various tasks. Maintaining rotation of the work string or, at least maintaining rotation of as much of the work string while the work string is downhole, is considered best practice in the industry. However, different sections of the work string may have different torque ratings. Further, in certain operations, a torque may be applied to the work string that does not exceed a torque rating of a first section but does exceed a torque rating of a second section.

BRIEF DESCRIPTION OF THE DRAWINGS

Embodiments of the system and method for controlling a downhole operation using a clutch tool are described with reference to the following figures. The same numbers are used throughout the figures to reference like features and components. The features depicted in the figures are not necessarily shown to scale. Certain features of the embodiments may be shown exaggerated in scale or in somewhat schematic form, and some details of elements may not be shown in the interest of clarity and conciseness.

DETAILED DESCRIPTION

Figure 1:
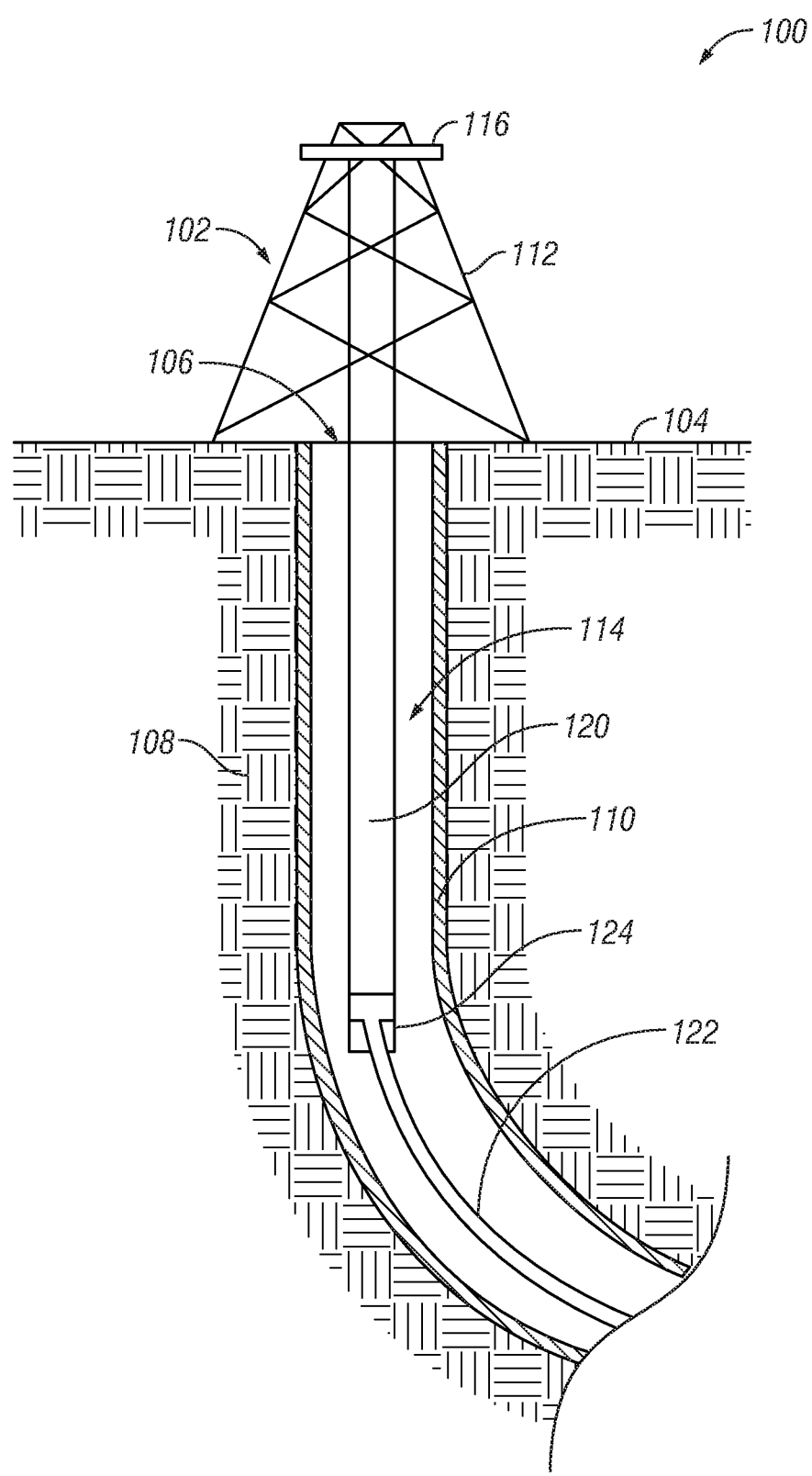
FIG. 1 illustrates a schematic view of a well system with a work string.

FIG. 1 illustrates a well system 100 that includes a rig 102 located at a surface 104 of a well 106 that extends into a formation 108. The well 106 is an opening in the formation 108 and includes a tubular such as a casing 110 or a lining or the well 106 may be an open hole. The well 106 is used to extract fluids or store fluids, such as hydrocarbons or water. Further, while the well 106 is shown as extending vertically and horizontally into the formation 108, the well 106, or portions of the well 106, may extend at any angle between vertical and horizontal. In some embodiments, the well 106 may extend only vertically into the formation 108.

The rig 102 is utilized in operations that include the use of the well 106. For example, the rig 102 may include a drilling rig, a completion rig, a workover rig, or a servicing rig. The rig 102 includes a derrick 112 to physically support the structure of the rig 102, including a work string 114 and an elevator 116 that can raise and lower the work string 114. Further, the well system 100 is shown as a surface well but may also be used for an offshore well.

The work string 114 includes a first section 120 rotatably coupled to and positioned uphole from a second section 122 via a clutch tool 124. The first section 120, which is in an uphole direction of the second section 122, has a larger outer diameter than the second section 122. The differences in outer diameters of the first section 120 and the second section 122 may be to accommodate differences in diameter of the well 106. For example, the outer diameter of the first section 120 may be too large to fit within certain portions of the well 106 while the outer diameter of the second section 122 may fit within the narrower portions of the well 106.

Because the outer diameter of the first section 120 is larger than the second section 122, the torque rating of the first section 120 is also larger than the torque rating of the second section 122. Further, the torque ratings of the first section 120 and the second section 122 may be different even if the outer diameters of the first section 120 and the second section 122 are the same. In one or more embodiments, the orientation of the first section 120 and the second section 122 may be flipped. That is, the first section 120 may be positioned downhole with respect to the second section 122. While the work string 114 is within the well 106, it is desired to maintain rotation of the work string 114 to avoid overcoming static friction. The clutch tool 124 is utilized to prevent torque transfer between the first section 120 and the second section 122 when the applied torque is greater than the torque rating of the second section 122, but lower than the torque rating of the first section 120 or vice versa if the orientation of the first section 120 and the second section 122 is flipped.

Figure 2A:
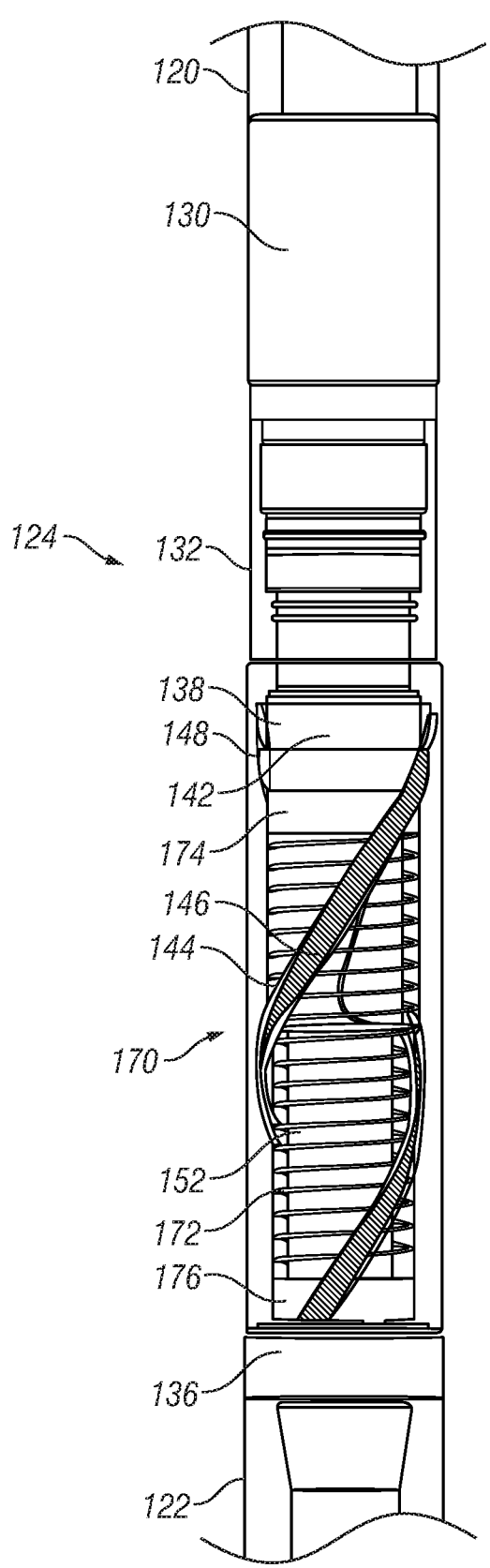
FIG. 2A illustrates a partial cross-sectional view of adjacent sections of a work string with an clutch tool engaged with both sections of the work string.
Figure 2B:
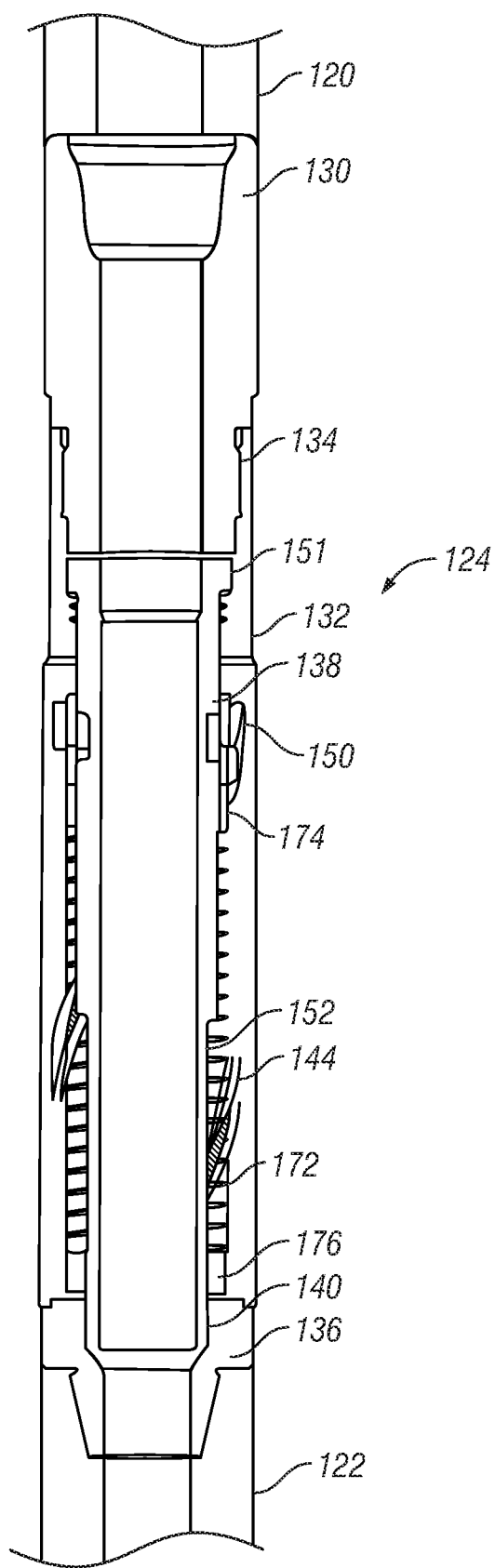
FIG. 2B illustrates a cross-sectional view of adjacent sections of the work string of FIG. 2A with the clutch tool engaged with both sections of the work string.

FIG. 2A is a partial cross-sectional view and FIG. 2B is a cross-sectional view of the clutch tool 124 that selectively transfers torque between the first section 120 and the second section 122. As illustrated, the clutch tool 124 is engaged with the first section 120 and the second section 122, thereby allowing transfer of torque between the first section 120 and the second section 122. As described in detail below, the clutch tool 124 ceases torque transfer between the first section 120 and the second section 122 in response to an amount of torque transferred through the clutch tool 124 exceeding a threshold amount. Further, the clutch tool 124 reestablishes torque transfer between the first section 120 and the second section 122 in response to the amount of torque transferred through the clutch tool 124 dropping below the threshold amount.

The clutch tool 124 includes an uphole sub 130 that couples to the first section 120 such that the uphole sub 130 does not rotate relative to the first section 120. A housing 132 of the clutch tool 124 is coupled to the uphole sub 130 via threads 134. The housing 132 may also be coupled to the uphole sub 130 via welds or the housing 132 may be integral to the uphole sub 130. After a coupling between the housing 132 and the uphole sub 130 is established, the housing 132 does not rotate with respect to the uphole sub 132.

The clutch tool 124 also includes a downhole sub 136 that couples to the second section 122 such that the downhole sub 136 does not rotate relative to the second section 122. An inner mandrel 138 of the clutch tool 124 is coupled to the downhole sub 136 via threads 140. In one or more embodiments, the inner mandrel 138 may be coupled to the downhole sub 136 via welds or the inner mandrel 138 may be integral to the downhole sub 136. After a coupling between the inner mandrel 138 and the downhole sub 136 is established, the inner mandrel 138 does not rotate with respect to the downhole sub 136. A shoulder 151 of the inner mandrel 138 lands on the housing 132 to prevent axial movement between the inner mandrel 138 and the housing 132 in one direction, and the inner mandrel 138 is blocked by the uphole sub 130 to prevent axial movement between the inner mandrel 138 and the housing 132 in the other direction.

The housing 132 includes inner grooves 144 positioned in an inner surface of the housing 132, and the inner mandrel 138 includes outer grooves 146 positioned in an outer surface of the inner mandrel 138. The housing 132 and the inner mandrel 138 are rotatably coupled to one another via a torque sleeve 142 that includes outer protrusions 148 positioned within the inner grooves 144 of the housing 132 and inner protrusions 150 positioned within the outer grooves 146 of the inner mandrel 138.

Figure 4A:
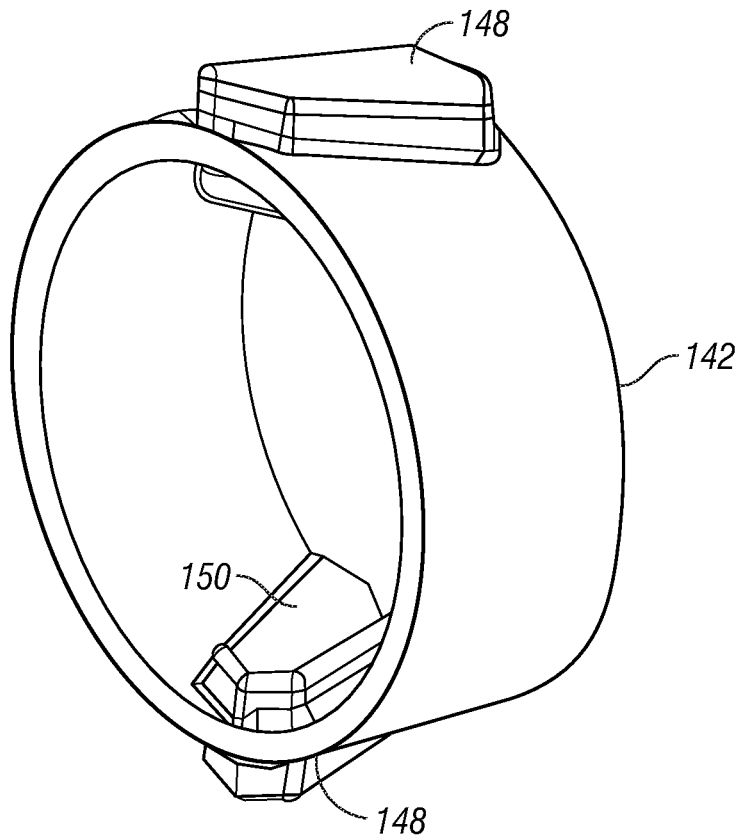
FIG. 4A illustrates a perspective view of a torque sleeve used in the clutch tool of FIG. 2A.

FIG. 4A provides a detailed view of the torque sleeve 142, which includes two outer protrusions 148 and two inner protrusions 150. The outer protrusions 148 and inner protrusions 150 are angled to fit within the helical grooves of the housing and inner mandrel. The protrusions 148, 150 being angled provide a force on the torque sleeve 142 in a downhole direction when a torque is applied to the toque sleeve 142. This force causes the torque sleeve 142 to be biased in a downhole direction in response to a torque applied to the torque sleeve 142. Further, the outer protrusions 148 and inner protrusions 150 are positioned at the same angular position. However, the outer protrusions 148 and the inner protrusions 150 may also be positioned at any angular position relative to each other. Further, the number of outer protrusions 148 or inner protrusions 150 may include 1, 3, 4, 5, 6, or more protrusions.

Both the inner grooves 144 and the outer grooves 146 are helical. Additionally, the inner mandrel 138 includes a torque transition area 152 opening from the outer grooves 146 such that the outer diameter of the inner mandrel 138 matches the outer diameter of the outer grooves 146. The torque transition area 152 extends completely around the inner mandrel 138.

If sufficient torque is transferred, resistance of the inner mandrel 138 causes relative rotation between the housing 132 and the inner mandrel 138, thus moving the torque sleeve 142 axially along the length of the housing 132 and the inner mandrel 138. After a sufficient amount of relative rotation between the housing 132 and the inner mandrel 138, the torque sleeve 142 is moved axially from engagement with the outer grooves 146 to the torque transition area 152 where the torque sleeve 142 is disengaged from the outer grooves 146. Disengagement of the torque sleeve 142 from the outer grooves 146 allows the housing 132 to rotate freely with respect to the inner mandrel 138, causing torque to not be transferred between housing 132 and the inner mandrel 138.

The clutch tool 124 includes a biasing device 170 that biases the torque sleeve 142 out of the torque transition area 152 and into engagement with the outer grooves 146. The biasing device 170 includes a spring 172 and an uphole collar 174 and a downhole collar 176 to contain the spring 172. The uphole collar 174 abuts the torque sleeve 142 to bias the torque sleeve in an uphole direction and into engagement with outer grooves 146. The amount of biasing provided by the biasing device 170 may be adjusted by providing springs with different spring constants.

Figure 3:
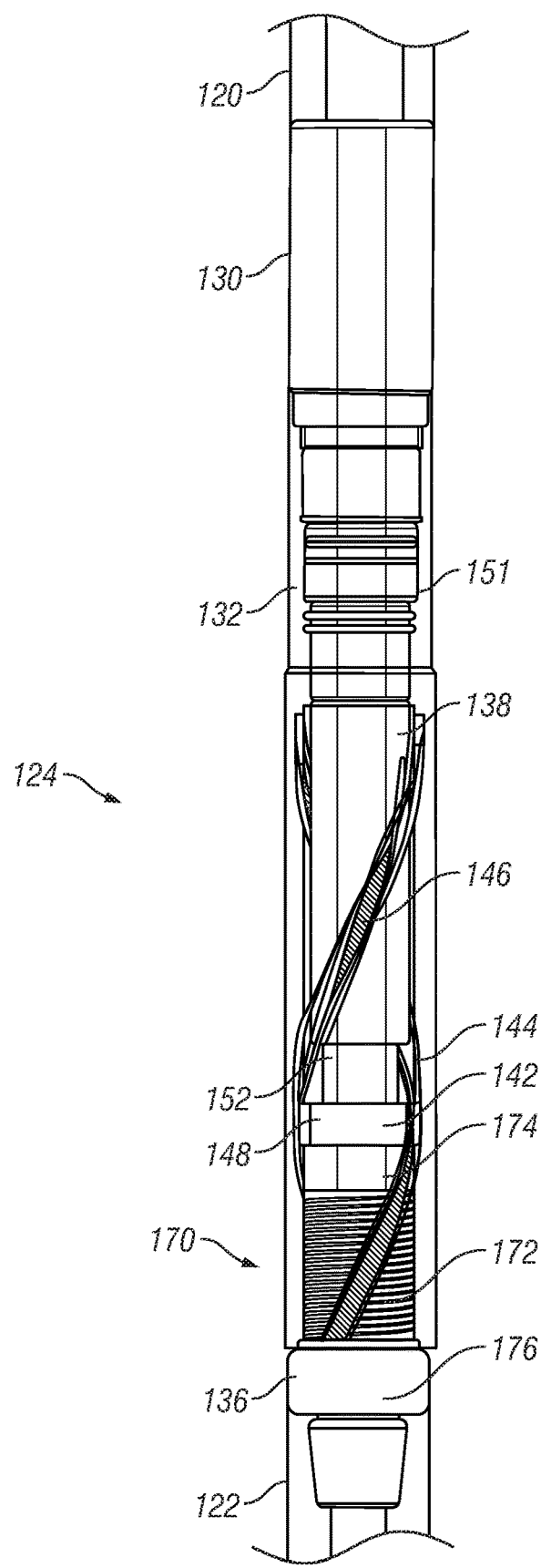
FIG. 3 illustrates a lateral view of adjacent section of a work string with the clutch tool of FIG. 2 disengaged from one of the sections of the work string.

As torque is transferred through the torque sleeve 142, a force is introduced in a downhole direction to compress the spring and allow the torque sleeve 142 to move axially downhole. Increasing the amount of torque transferred through the torque sleeve 142 increases the amount of force applied to move the torque sleeve 142 in a downhole direction. After the torque transferred through the torque sleeve 142 increases above a threshold amount, the torque sleeve moves axially out of engagement with the outer grooves 146 and into the torque transition area 152, while remaining engaged with the inner grooves 144. Once the torque sleeve 142 is in the torque transition area 152, as illustrated in FIG. 3, torque is not transferred between the housing 132 and the inner mandrel 138.

The spring 172 along with the length of the outer grooves 146 may be chosen based on a threshold amount of torque that causes the torque sleeve 142 to disengage from the outer grooves 146. For example, the threshold amount of torque may be based on a torque rating of the second section 122, such as a certain amount of torque below the torque rating of the second section 122.

When the torque sleeve 142 is in the torque transition area 152, the torque sleeve 142 may continue moving in a downhole direction if the amount of torque applied to the torque sleeve 142 continues to increase. Further, when the torque sleeve 142 is in the torque transition area 152, the torque sleeve 142 may move in an uphole direction if the amount of torque applied to the torque sleeve 142 decreases. After the amount of torque applied to the torque sleeve 142 decreases below the threshold amount, the torque sleeve 142 reengages with the outer grooves 146, thereby reestablishing torque transfer between the housing 132 and the inner mandrel 138 due to the biasing device 170 biasing the torque sleeve 142. In this manner, the clutch tool 124 can provide torque transfer between the first section 120 and the second section 122, cease torque transfer, and reestablish torque transfer based on the amount of torque applied to the clutch tool 124.

Figure 4B:
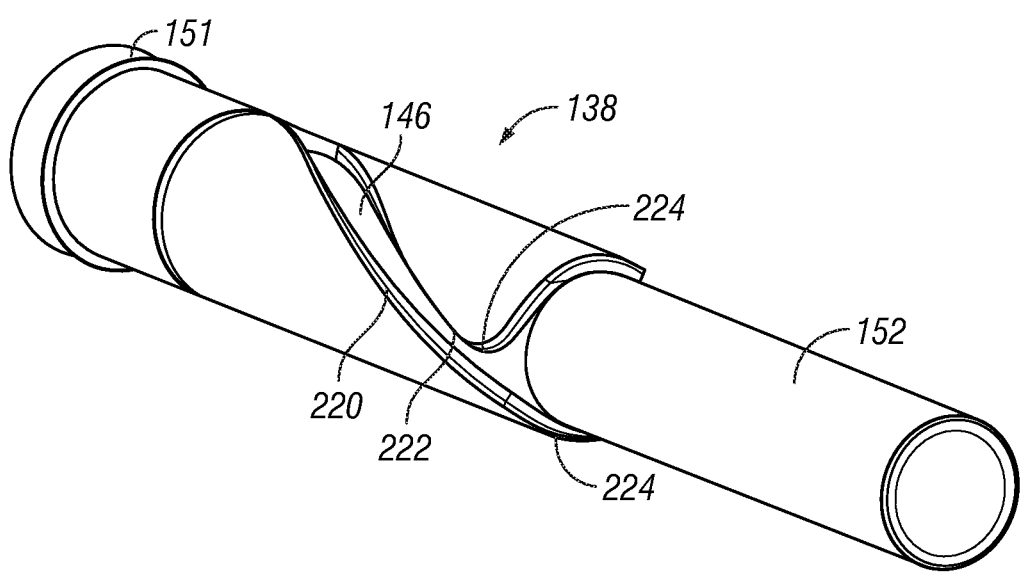
FIG. 4B illustrates a perspective view of an inner mandrel used in the clutch tool of FIG. 2A.

FIG. 4B illustrates a detailed view of the inner mandrel 138. As described above, the inner mandrel 138 includes the shoulder 151 to interact with the housing 132, which prevents axial movement between the inner mandrel 138 and the housing 132. The inner mandrel 138 also includes outer grooves 146 that interact with the inner grooves 150 of the torque sleeve 142. The outer grooves 146 extend only partially along the length of the inner mandrel 138, and open into the torque transition area 152 where the inner protrusions do not apply a torque to the inner mandrel 138. The outer grooves 146 each include a first side 220 and a second side 222, with one of the sides 220, 222 extending further along the length of the inner mandrel 138 than the other. Further, each of the sides 220, 222 ends with a curved section 224. The difference in length of the sides 220, 222 along with the curved section 224 reduces stress concentrations on the sides 220, 222 due to the impact of the torque sleeve 142 as the torque sleeve 142 moves from the torque transition area 152 to the outer grooves 146 to reestablish torque transfer between the housing 132 and the inner mandrel 138.

The present disclosure may be used to control a downhole operation using a clutch tool. The clutch tool may be utilized to couple a first section of a string to a second section of string. The radial support may be positioned downhole of a stator contour and between the stator housing and components contained within the stator housing, such as a rotor, an adapter, and/or a transmission. The radial support may prevent contact between the stator housing and components contained within the stator housing. Further, the radial support may decrease the radial range of motion of components contained within the stator housing, thereby reducing stresses acting on the stator contour and chunking of the stator contour and increasing the durability and longevity of the stator contour. Further, the radial support may be replaceable.

Further examples may include:

Example 1 is a clutch tool for controlling torque transfer between first and second sections of a work string. The clutch tool includes a housing that is non-rotatable with respect to the first section of the work string and comprising inner grooves. The clutch tool also includes an inner mandrel that is non-rotatable with respect to the second section of the work string. The inner mandrel includes outer grooves that extend along only an axial portion of the inner mandrel. Further, the inner mandrel includes a torque transition area opening from the outer grooves and extending completely around the inner mandrel. The clutch tool also includes a torque sleeve comprising inner protrusions engageable with the outer grooves and outer protrusions engageable with the outer grooves, the outer protrusions being angled. Moreover, the clutch tool includes a biasing device to bias the inner protrusions of the torque sleeve into engagement with the outer grooves. In addition, the biasing device is configured to bias the torque sleeve into engagement with both the inner and outer grooves such that torque is transferred between the housing and the inner mandrel. Further, torque transfer between the housing and the inner mandrel overcomes the bias of the biasing device to move the torque sleeve axially along the inner mandrel. Also, when the torque exceeds a threshold, the torque sleeve is moved into the torque transition area, disengaging the torque sleeve from the outer grooves and preventing transmission of torque between the housing and the inner mandrel.

In Example 2, the subject matter of Example 1 can further include wherein the biasing device biases the torque sleeve in an uphole direction.

In Example 3, the subject matter of Examples 1-2 can further include an uphole sub coupled to the housing, wherein torque is transferred to the housing via the uphole sub.

In Example 4, the subject matter of Examples 1-3 can further include a downhole sub coupled to the inner mandrel, wherein torque is transferred from the inner mandrel via the downhole sub.

In Example 5, the subject matter of Examples 1–4 can further include wherein an outer diameter of the torque transition area matches an outer diameter of the outer grooves.

In Example 6, the subject matter of Examples 1-5 can further include wherein the torque sleeve is axially moveable from disengagement with the outer grooves to engagement with the outer grooves by the biasing device in response to a torque applied to the torque sleeve falling below the threshold torque.

In Example 7, the subject matter of Examples 1-6 can further include wherein the threshold torque is below a torque rating of the second section of the work string.

In Example 8, the subject matter of Examples 1-7 can further include wherein a first side of each of the outer grooves extends further along a length of the inner mandrel than a second side of each of the outer grooves.

In Example 9, the subject matter of Examples 1-8 can further include wherein an outer diameter of the first section is greater than the second section.

In Example 10, the subject matter of Examples 1-9 can further include wherein the inner grooves and the outer grooves are helical grooves.

Example 11 is a method for controlling torque between sections of a work string through a clutch tool. The method includes transferring torque between a housing that is non-rotatable with respect to a first section of the work string and an inner mandrel that is non-rotatable with respect to a section of the work string via a torque sleeve engaged with and located between the housing and the inner mandrel. The method further includes increasing the amount of torque transferred through the torque sleeve above a threshold amount to axially move the torque sleeve against a biasing force in a first direction to a torque transition area where the torque sleeve and the housing are rotatable with respect to the inner mandrel and thus cease the transfer of torque. In addition, the method includes reestablishing torque transfer through the torque sleeve by axially moving the torque sleeve with the biasing force in a second direction out of the torque transition area by lowering torque applied to the torque sleeve below the threshold amount.

In Example 12, the subject matter of Example 11 can further include wherein biasing the torque sleeve comprises biasing the torque sleeve in an uphole direction.

In Example 13, the subject matter of Examples 11-12 can further include wherein axially moving the torque sleeve into the torque transition area comprises disengaging from outer grooves of the inner mandrel, and the torque transition area has an outer diameter that matches an outer diameter of the outer grooves, and the torque transition area extends around the inner mandrel.

In Example 14, the subject matter of Examples 11-13 can further include transferring torque between the housing and the first section via an uphole sub coupled to the housing.

In Example 15, the subject matter of Examples 11-14 can further include transferring torque between the inner mandrel and the second section via a downhole sub coupled to the inner mandrel.

In Example 16, the subject matter of Examples 11-15 can further include wherein a first side of each of the outer grooves extends further along a length of the inner mandrel than a second side of each of the outer grooves.

In Example 17, the subject matter of Examples 11-16 can further include wherein the threshold torque is below a torque rating of the second section of the work string.

In Example 18, the subject matter of Examples 11-17 can further include wherein an outer diameter of the first section is greater than an outer diameter of the second section.

In Example 19, the subject matter of Examples 11-18 can further include wherein the inner grooves and the outer grooves are helical grooves.

Example 20 is a downhole work string that includes a first section comprising a first torque rating, a second section rotatable with respect to the first section and comprising a second torque rating that is less than the first torque rating, and a clutch tool for controlling torque transfer between the first and second sections of the work string. The clutch tool includes a housing that is non-rotatable with respect to the first section of the work string and comprising inner grooves. The clutch tool also includes an inner mandrel that is non-rotatable with respect to the second section of the work string. The inner mandrel includes outer grooves that extend along only an axial portion of the inner mandrel. Further, the inner mandrel includes a torque transition area opening from the outer grooves and extending completely around the inner mandrel. The clutch tool also includes a torque sleeve comprising inner protrusions engageable with the outer grooves and outer protrusions engageable with the outer grooves, the outer protrusions being angled. Moreover, the clutch tool includes a biasing device to bias the inner protrusions of the torque sleeve into engagement with the outer grooves. In addition, the biasing device is configured to bias the torque sleeve into engagement with both the inner and outer grooves such that torque is transferred between the housing and the inner mandrel. Further, torque transfer between the housing and the inner mandrel overcomes the bias of the biasing device to move the torque sleeve axially along the inner mandrel. Also, when the torque exceeds a threshold, the torque sleeve is moved into the torque transition area, disengaging the torque sleeve from the outer grooves and preventing transmission of torque between the housing and the inner mandrel.

Certain terms are used throughout the description and claims to refer to particular features or components. As one skilled in the art will appreciate, different persons may refer to the same feature or component by different names. This document does not intend to distinguish between components or features that differ in name but not function.

Reference throughout this specification to "one embodiment," "an embodiment," "an embodiment," "embodiments," "some embodiments," "certain embodiments," or similar language means that a particular feature, structure, or characteristic described in connection with the embodiment may be included in at least one embodiment of the present disclosure. Thus, these phrases or similar language throughout this specification may, but do not necessarily, all refer to the same embodiment.

The embodiments disclosed should not be interpreted, or otherwise used, as limiting the scope of the disclosure, including the claims. It is to be fully recognized that the different teachings of the embodiments discussed may be employed separately or in any suitable combination to produce desired results. In addition, one skilled in the art will understand that the description has broad application, and the discussion of any embodiment is meant only to be exemplary of that embodiment, and not intended to suggest that the scope of the disclosure, including the claims, is limited to that embodiment.

What is claimed is:

1. A clutch tool for controlling torque transfer between first and second sections of a work string, the clutch tool comprising:
   a housing that is non-rotatable with respect to the first section of the work string and comprising inner grooves;
   an inner mandrel that is non-rotatable with respect to the second section of the work string, the inner mandrel comprising:
      outer grooves that extend along only an axial portion of the inner mandrel; and
      a torque transition area opening from the outer grooves and extending completely around the inner mandrel;
   a torque sleeve comprising inner protrusions engageable with the outer grooves and outer protrusions engageable with the outer grooves, the outer protrusions being angled;
   a biasing device to bias the inner protrusions of the torque sleeve into engagement with the outer grooves;
   wherein the biasing device is configured to bias the torque sleeve into engagement with both the inner and outer grooves such that torque is transferred between the housing and the inner mandrel;
   wherein torque transfer between the housing and the inner mandrel overcomes the bias of the biasing device to move the torque sleeve axially along the inner mandrel; and
   wherein when the torque exceeds a threshold, the torque sleeve is moved into the torque transition area, disengaging the torque sleeve from the outer grooves and preventing transmission of torque between the housing and the inner mandrel.

2. The clutch tool of claim 1, wherein the biasing device biases the torque sleeve in an uphole direction.

3. The clutch tool of claim 1, comprising an uphole sub coupled to the housing, wherein torque is transferred to the housing via the uphole sub.

4. The clutch tool of claim 1, comprising a downhole sub coupled to the inner mandrel, wherein torque is transferred from the inner mandrel via the downhole sub.

5. The clutch tool of claim 1, wherein an outer diameter of the torque transition area matches an outer diameter of the outer grooves.

6. The clutch tool of claim 1, wherein the torque sleeve is axially moveable from disengagement with the outer grooves to engagement with the outer grooves by the biasing device in response to a torque applied to the torque sleeve falling below the threshold torque.

7. The clutch tool of claim 5, wherein the threshold torque is below a torque rating of the second section of the work string.

8. The clutch tool of claim 1, wherein a first side of each of the outer grooves extends further along a length of the inner mandrel than a second side of each of the outer grooves.

9. The clutch tool of claim 1, wherein an outer diameter of the first section is greater than the second section.

10. The clutch tool of claim 1, wherein the inner grooves and the outer grooves are helical grooves.

11. A downhole work string comprising:
   a first section comprising a first torque rating;
   a second section rotatable with respect to the first section and comprising a second torque rating that is less than the first torque rating; and
   a clutch tool for controlling torque transfer between the first and second sections of the work string, the clutch tool comprising:
      a housing that is non-rotatable with respect to the first section of the work string and comprising inner grooves;
      an inner mandrel that is non-rotatable with respect to the second section of the work string, the inner mandrel comprising:
         outer grooves that extend along only an axial portion of the inner mandrel; and
         a torque transition area opening from the outer grooves and extending completely around the inner mandrel and with an outer diameter that matches the outer diameter of the outer grooves;
      a torque sleeve comprising inner protrusions engageable with the outer grooves and outer protrusions engageable with the outer grooves, the outer protrusions being angled;
      a biasing device to bias the inner protrusions of the torque sleeve into engagement with the outer grooves;
      wherein the biasing device is configured to bias the torque sleeve into engagement with both the inner and outer grooves such that torque is transferred between the housing and the inner mandrel;
      wherein torque transfer between the housing and the inner mandrel overcomes the bias of the biasing device to move the torque sleeve axially along the inner mandrel; and wherein when the torque exceeds a threshold, the torque sleeve is moved into the torque transition area, disengaging the torque sleeve from the outer grooves and preventing transmission of torque between the housing and the inner mandrel.

* * * * *